United States Patent [19]
Livingston

[11] Patent Number: 4,876,431
[45] Date of Patent: Oct. 24, 1989

[54] MICROPROCESSOR WELDER CONTROLLER

[75] Inventor: Douglas J. Livingston, Wilmot Flat, N.H.

[73] Assignee: Black & Webster, Inc., Waltham, Mass.

[21] Appl. No.: 197,158

[22] Filed: May 23, 1988

[51] Int. Cl.$^4$ .............................................. B23K 11/24
[52] U.S. Cl. ..................................... 219/110; 219/114
[58] Field of Search ............. 219/114, 110, 108, 117.1

[56] References Cited

U.S. PATENT DOCUMENTS

| | | | |
|---|---|---|---|
| 3,167,704 | 1/1965 | Maag | 219/114 |
| 3,504,157 | 3/1970 | Vanderhelst | 219/114 |
| 4,359,622 | 11/1982 | Dostoomian et al. | 219/110 |
| 4,456,809 | 6/1984 | Jones et al. | 219/114 |
| 4,458,132 | 7/1984 | Reynolds et al. | 219/114 |

Primary Examiner—Clifford C. Shaw
Attorney, Agent, or Firm—Joseph S. Iandiorio; Brian M. Dingman

[57] ABSTRACT

A welding system controller for controlling the welding of a workpiece including a switch for selectively applying power to a welding transformer and a controller for controlling the power delivered to the welding transformer by the switch to set the power level of the welding transformer. The controller allows the operator to set the time to reach the set power level, the time the set power level is maintained, and the time to decrease the power level from the set power level to zero.

33 Claims, 4 Drawing Sheets

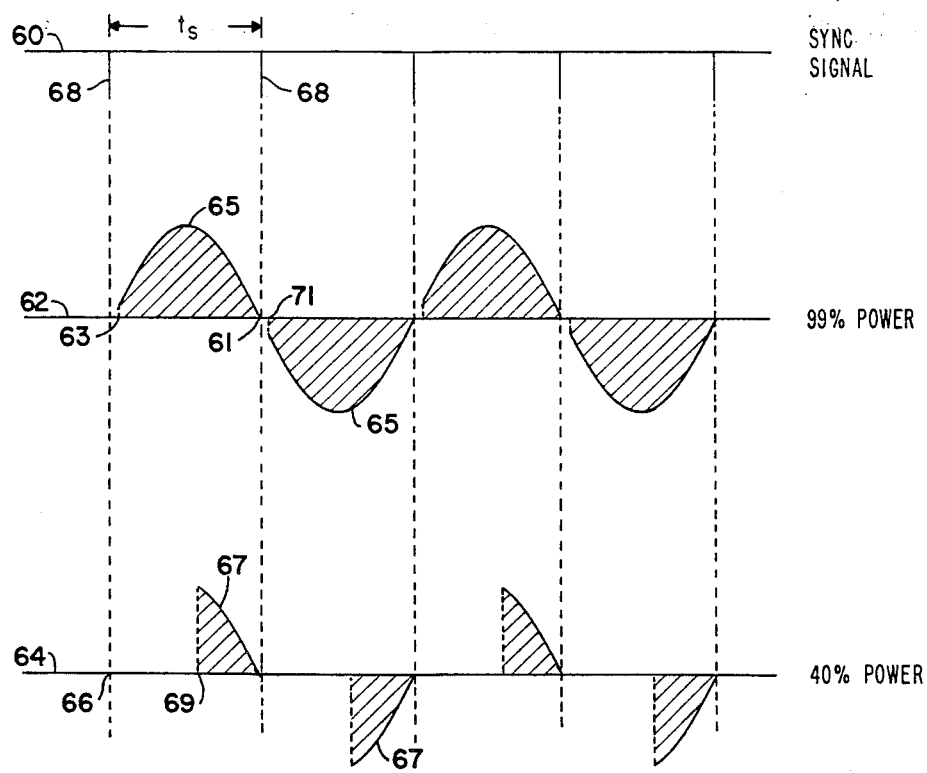
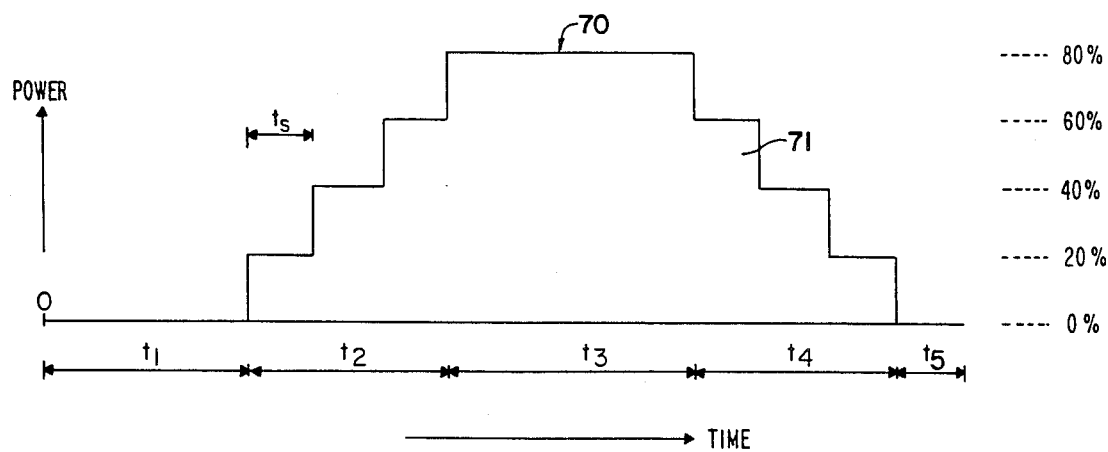

ically short, perhaps only a few half cycles. Usually, the power switch used to control the welding transformer is made from inverse-parallel Silicon Controlled Rectifiers (SCRs) Whereas these SCRs may be turned on at any point in each half cycle of the AC power line wave, they turn off only when the current through them drops to zero, approximately the point when line voltage is zero. Thus, there may be an uncertainty of one-half cycle in determining the duration of the welding cycle. For example, a weld time of 0.025 seconds could be as short as three or as long as four half cycles depending on whether the initiation of the weld occurs shortly after, or at the moment, of, a power line voltage zero crossing.

MICROPROCESSOR WELDER CONTROLLER

FIELD OF INVENTION

This invention relates to a welding controller and more particularly to such a controller that provides great flexibility to a synchronous welding system.

BACKGROUND OF INVENTION

Welding controllers are historically of two types: random fired non-synchronous and synchronous. Controls used on large welders are typically non-synchronous, and include an electromechanical cycle timer. Small welders are most often synchronous. These controls have been suitable in the past for producing welds of mild steel and performing other simple welds. However, for more complex welds, involving materials of dissimilar thickness, or of dissimilar or brittle materials, synchronous controls capable of complex power versus time profiles with tempering cycles are more often required.

The reason for timing welding events in synchronism with the power line may be described as follows. Welding times may be very short, perhaps only a few half cycles. Usually, the power switch used to control the welding transformer is made from inverse-parallel Silicon Controlled Rectifiers (SCRs) Whereas these SCRs may be turned on at any point in each half cycle of the AC power line wave, they turn off only when the current through them drops to zero, approximately the point when line voltage is zero. Thus, there may be an uncertainty of one-half cycle in determining the duration of the welding cycle. For example, a weld time of 0.025 seconds could be as short as three or as long as four half cycles depending on whether the initiation of the weld occurs shortly after, or at the moment, of, a power line voltage zero crossing.

However, if the weld time can be made to start at precisely the same point on the AC power line wave every time, as with a synchronous controller, the weld time can be precisely repeated at the desired number of cycles for every weld. This gives a very consistent weld joint.

Various types of welding controls are in current use. These include analog and digital controls based on discrete semiconductors, integrated circuits, and more recently, microprocessors. All of these controls use a large number of discrete components. As a result, they lack versatility, are difficult to assemble, subject to incorrect assembly, and are difficult to repair. The heat or power control on analog controls is usually an analog dial, making precise setting, as well as repeatability, difficult to accomplish.

Controls using digital integrated circuits are an improvement. These controls have found wide use because of the availability of complex IC's incorporating the equivalent of thousands of discrete semiconductors. However, these controls still require many IC's. Variations in weld schedule requirements are difficult or impossible to accomplish because modifications must be made to the hardware.

More recently, welding controls using microprocessors have been developed. These have the benefit of reducing the number of IC's used, as well as allowing for variations in weld schedule to be programmed into the memory. A typical microprocessor-based control has a number of discrete components: a microprocessor (MPU), random access memory (RAM) to store intermediate date, read-only memory (ROM) for program storage, an oscillator, or clock, to determine when events will happen, and an input/output device to communicate with the outside world.

In addition to the above, there are several other IC's required in any control to perform display, timing, monitoring and feedback of system operating parameters and other functions. The IC count in a typical microprocessor based welding control, therefore, may be fifteen or more.

SUMMARY OF INVENTION

It is therefore an object of this invention to provide an improved welding controller.

It is a further object of this invention to provide a welding controller that heats the workpiece at an adjustable rate to allow welding of dissimilar and thin materials.

It is a further object of this invention to provide a welding controller that is relatively easy to manufacture and service.

It is a further object of this invention to provide a welding controller in which welding parameters can be changed without replacing hardware.

It is a further object of this invention to provide a welding controller which is microcomputer based.

This invention results from the realization that synchronous welding controllers may be improved considerably by providing a controller which allows welding parameters such as weld power, time, and heat up and cool down rates to be chosen by the operator to allow precision welding of extremely thin and/or dissimilar materials.

This invention features a welding system controller for controlling the welding of a workpiece including a switch for selectively applying power to a welding transformer and a controller for controlling the power delivered to the welding transformer by the switch to set the power level of the welding transformer. The controller allows the operator to set the time to reach the set power level, the time the set power level is maintained, and the time to decrease the power level of the welding transformer to zero. Typically, the controller actuates the switch for a selected portion of each half cycle of the power feeding the switch.

In a preferred embodiment, the switch includes at least one SCR. Preferably, the controller includes an SCR driver for actuating the SCRs. The controller typically includes a single chip microcomputer which controls the time that the SCRs are actuated by the SCR driver. Typically, this time is a selected portion of each half cycle of the line power.

In an alternative preferred embodiment, the operator chooses the time to reach the set power level and the time to decrease the set power level to zero by choosing the number of incremental steps to accomplish the power change. Each step is typically separated by a predetermined time interval, and the controller includes means for setting this time interval. The period of the synchronizing signal is preferably derived from the period of the line power. In that case, the operator may select the period of the synchronizing signal as an integral number of multiples of one-half of the period of the line power.

The synchronizing signal typically turns off the switch to de-energize the welding transformer. Then, the controller may turn on the switch a preselected time after it is turned off by the synchronizing signal. The operator typically may choose this preselected time as an integral number of multiples of a preselected timing interval of the controller. This timing interval, which is typically programmed into the controller and is not chosen by the operator, is typically related to the synchronizing signal period.

The operator may also typically choose the polarity of the first half cycle of the power to the welding transformer. In addition, the welding controller may also include at least one solenoid controlled by the controller. Typically, the solenoids engage the welding electrodes with the workpiece. Alternatively, the solenoids may perform any other work that is desired to be performed by the welding controller. In any case, the operator preferably may choose the time that the solenoid is energized.

The controller also preferably includes one or more ports for accepting analog control information. A thermocouple may be provided communicating with one of these ports for monitoring the temperature of the workpiece. The controller may then have the capability of varying the power delivered to the welding transformer to keep the workpiece at a predetermined temperature. A line voltage monitor communicating with an analog port may also be included. The controller then typically automatically compensates the power level to the welding transformer to keep it constant when the line voltage fluctuates. Finally, a welding transformer power level monitor communicating with an analog port may also be included. The controller may then have the capability of shutting off the switch when the power level of the welding transformer falls outside of a predetermined acceptable power range, and may be programmed to keep the power level at its set point if the voltage or resistance changes.

DESCRIPTION OF PREFERRED EMBODIMENT

Other objects, features and advantages will occur from the following description of a preferred embodiment and the accompanying drawings, in which:

FIG. 3 is a power verses time profile of the SCRs of FIG. 2;

FIG. 4 is a power verses time profile of the welding transformer of FIG. 2 at 80 percent power.

Figure 1:
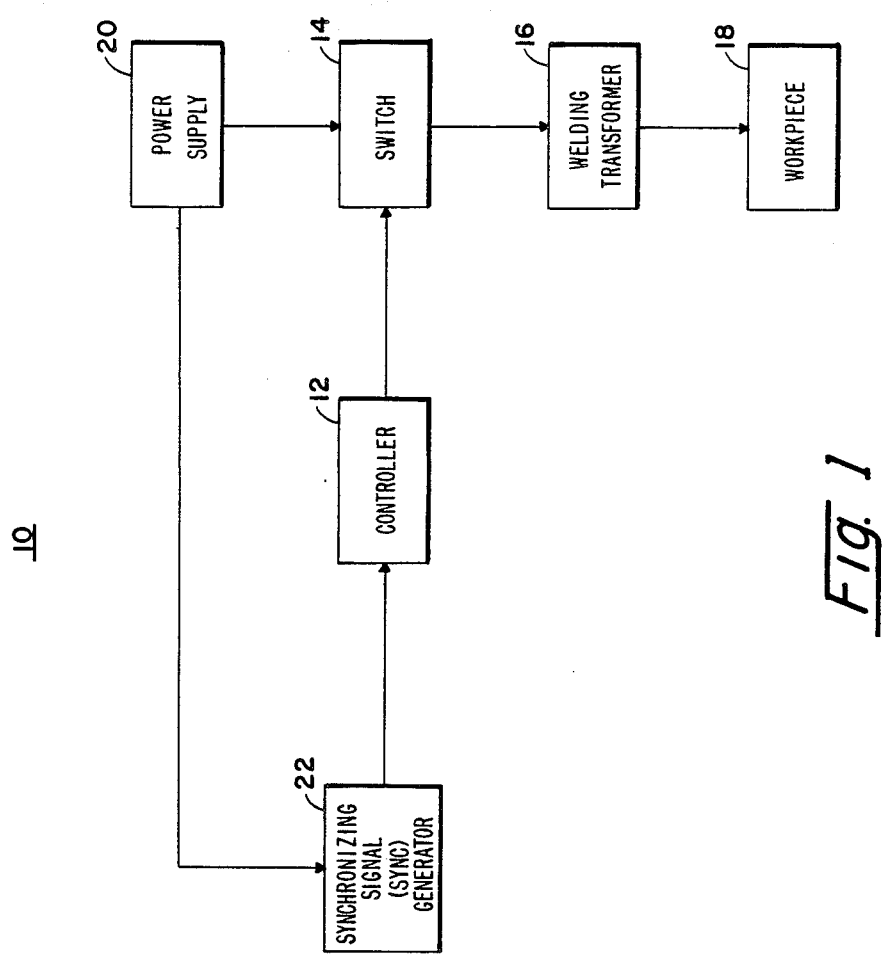
FIG. 1 is a simplified block diagram of a welding controller according to this invention.

A welding controller according to this invention may be accomplished by providing an SCR driver for actuating at least one SCR to selectively apply power to a welding transformer. A single-chip microcomputer is provided for controlling the SCR driver to control the power delivered to the welding transformer by the SCRs and set the power level of the transformer. The controller allows the operator to set the power level of the welding transformer, the time taken to reach this power level, the time the power level is maintained, and the time to decrease the power from the set power level to a zero power level. This provides a welding controller with the flexibility required to allow welding of extremely thin and/or dissimilar materials.

Another advantage of this welding controller is that it can be programmed to run any number of subroutines, each including a number of welding steps. This allows the operator to merely pick the correct subroutine to accomplish the desired weld. In addition, the programs may include the flexibility of allowing the operator to choose the value of a number of weld parameters. In addition to the parameters listed above, the operator may choose the time that one or more remote solenoids are energized, a post-anneal time and the anneal heat or power. As a result, the welding controller according to this invention provides a synchronous controller that can be used to control the welding of practically any materials.

The controller typically sets the power level of the welding transformer by controlling the time that the SCRs are actuated. This is preferably accomplished by including a synchronizing generator that provides a synchronizing signal for the microcomputer. The period of the synchronizing signal is typically chosen as an integral number of multiples of one-half of the period of the line power feeding the controller. For example, for 60 Hz line power, the synchronizing signal is typically chosen as one-half cycle or 8.3 milliseconds. This synchronizing signal turns off the SCRs at each zero crossing of the line power to de-energize the welding transformer.

Once the SCRs are turned off by the synchronizing signal, they are turned on again after a preselected time. This preselected time is typically an integral number of multiples of a preselected timing interval of the microcomputer system. The timing interval is typically programmed into the microcomputer as a preselected multiple of the period of the microcomputer clock. The timing interval may be chosen as, for example, 32 microseconds. Although 32 microseconds is one example of a preferred timing interval, any timing interval can be chosen. For a 32 microseconds timing interval and a one-half cycle or 8.3 millisecond synchronizing signal, there are 260 timing interval periods in each synchronizing signal. These timing interval periods are counted by the microcomputer.

The operator can choose the amount of time after the SCRs are turned off that they are turned on again simply by choosing the percent heat or power of the welding transformer. For example, a 75 percent heat setting will turn on the SCRs for 75 percent of the time of each cycle. With a 32 microsecond timing interval, the microcomputer turns on the SCRs after it counts 65 timing intervals, which is 2,080 microseconds. The SCRs remain on for the remaining 75% of the period of the synchronizing signal, which is 195 timing intervals or 6,240 microseconds. After this time, the SCR driver receives another synchronizing signal, which again turns off the SCRs. The turn on time delay is then repeated for each half-cycle of the 60 Hz AC line power to provide the 75 percent power feed to the welding transformer.

The welding controller also allows the operator to choose the time it takes for the welding transformer to ramp up to the chosen power level and to ramp down from that level to zero power. This in effect allows the operator to choose the slope of the power verses time profile of the transformer. Typically, the power level of the welding transformer is increased in incremental steps, and the operator chooses the number of steps to reach the set power level. Each of these steps is typically separated by a predetermined time interval. This time interval is typically the period of the synchronizing signal. The operator then chooses the time to decrease the power level from its set level to zero power in the same manner. By also allowing the operator to select the time the transformer stays at the set power level, the welding controller according to this invention allows the operator to choose any simple or complex power verses time profile for the welding transformer to accomplish the welding of virtually any materials.

Finally, the controller also preferably allows the operator to choose the polarity of the first half cycle of the power fed to the transformer to provide selective first heating of one or the other of the materials being welded.

The single-chip microcomputer preferably includes a number of analog ports for accepting analog control information. Typically, there is one port for accepting an amplified DC voltage from a thermocouple. This allows the temperature of the materials being annealed or soldered to be monitored during the course of the operation. The microcomputer system can then be provided with the ability to automatically vary the power delivered to the welding transformer to keep the workpiece at a predetermined, set temperature. Analog ports may also be provided for monitoring the line voltage and the weld current. The system can then automatically adjust the power level of the welding transformer to compensate for power changes due to line voltage fluctuation and/or under or over current conditions caused by voltage changes or changes in electrode or material resistance. In addition, the system can shut down the welding transformer if the power level falls outside of a predetermined acceptable power range. This can prevent the transformer from remaining on if one or more SCRs do not shut off. The current monitoring also allows the system to shut down if an SCR does not turn on when it is signaled to do so. By providing these monitoring controls, the system will discontinue a weld if there is a problem that would result in an unacceptable weld or possibly damage the welding controller or the welding transformer.

There is shown in FIG. 1 a welding controller 10 for controlling the welding of workpiece 18 according to this invention. System 10 includes controller 12 which controls switch 14. Switch 14 delivers power from power supply 20 to welding transformer 16 to set the power level of the welding transformer. Welding transformer 16 provides power through welding electrodes to workpiece 18. Synchronizing signal generator 22, powered by power supply 20, provides a timing signal to controller 12 that synchronizes operation of controller 12 and switch 14.

Figure 2:
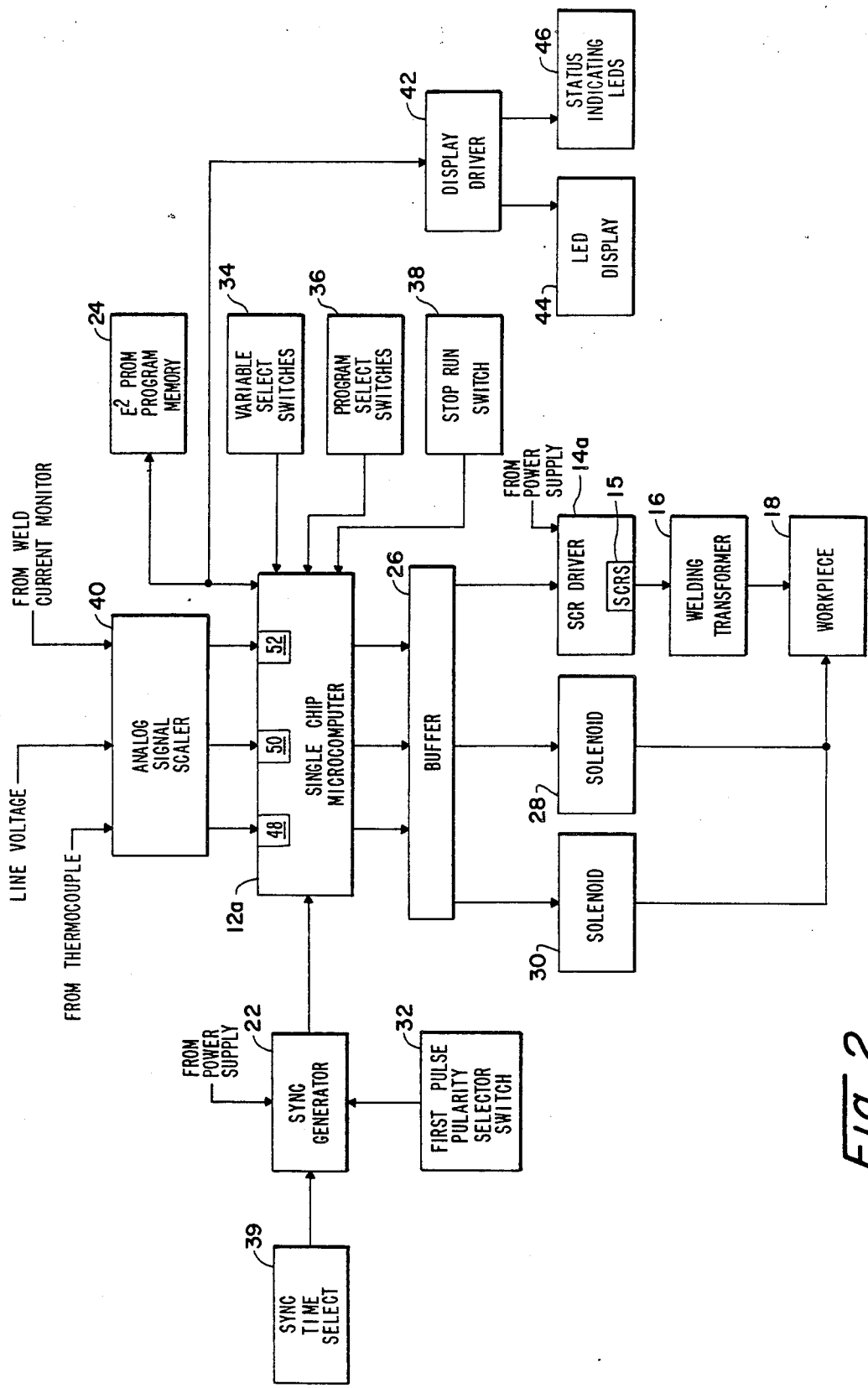
FIG. 2 is a detailed block diagram of a single-chip microcomputer based welding controller according to this invention.

A preferred embodiment of the welding controller of FIG. 1 is shown in detail in FIG. 2. Single-chip microcomputer 12a may be a Motorola #68705R5 that is responsive to a number of external, discrete components. E²PROM 24 provides program information to microcomputer 12a. Variable select switches 34, program select switches 36, stop run switch 38, synchronizing time select 39, and first pulse polarity selector switch 32 are the operator controlled switches that allow the operator to choose the welding parameters. The selection of these parameters is described in more detail in conjunction with FIGS. 5A and 5B.

Microcomputer 12a also includes A/D converters 48, 50 and 52. These A/D converters are responsive to analog signals from a remote thermocouple a line voltage monitor, and a weld current monitor, each of which are amplified by analog signal scaler 40. Microcomputer 12a outputs control information that may be amplified by optional buffer 26 before being passed to other discrete components. SCR driver 14a includes SCRs 15 that control the power delivered to the welding transformer to set its power level. The SCRs are supplied with power from a power supply, not shown. Transformer 16 powers the welding electrodes, not shown, at times controlled by SCR driver 14a.

The welding controller may also control one or more remote solenoids, for example solenoids 28 and 30. The remote solenoids may control movement of the welding electrodes or may perform other work such as clamping and holding the workpiece.

Microcomputer 12a also drives display driver 42, which in turn drives LED display 44 and status indicating LEDs 46. LED display 44 typically displays the value of the variable being selected by the operator. Status indicating LEDs 46 typically alert the operator to the weld step being performed at the present time.

Two examples of power verses time profiles for SCRs 15 are shown in FIG. 3. The power verses time profile 62 is for a maximum 99 percent power setting, and power verses time profile 64 depicts a 40 percent power setting. Profile 60 indicates the output of synchronizing generator 22, FIG. 2. This output includes negative pulses 68 which are provided at time intervals $t_S$. This synchronizing interval is selected by the operator, and is typically 8.3 milliseconds or one-half of a cycle of the 60 Hz line power. This period is the time base used throughout the welding controller.

For the maximum power setting of 99 percent, the SCRs are gated on at point 63, which is almost immediately after the zero line crossing of the power supply voltage. Microcomputer 12a, FIG. 2, signals SCR driver 14a to turn on SCRs 15 after 1 percent of 8.3 milliseconds has elapsed after generation of a synchronizing signal as described above. The SCRs then remain on until they are shut off again at point 61 by synchronizing signal 68. The cycle is then repeated for the negative half cycle of the line power when the SCRs are again turned on after being off for 1 percent of the synchronizing signal period at point 71. The total power output of the SCRs is indicated by shaded portion 65, and is actually more than 99 percent of the maximum available power because of the sinusoidal shape of curve 62.

An example of a lower, 40 percent power setting is shown by profile 64. SCRs 15, FIG. 2, are gated on by microcomputer 12a at point 69. Point 69 occurs after 60 percent of time $t_S$ has elapsed after point 66. In other words, microcomputer 12a gates SCRs 15 on for 40 percent of each half cycle. The total power delivered by the SCRs in this case is shown by shaded portion 67.

An example of a power verses time profile for welding transformer 16, FIG. 2, is shown in FIG. 4. Power profile 70 is for an 80 percent heat setting. The operator chooses this heat setting, as well as times $t_1$–$t_4$ and $t_S$ as described below. In operation, the solenoid that controls the welding electrodes is energized at time zero. After a delay of time $t_1$, the transformer power is ramped-up to the 80 percent power level over a time $t_2$. The chosen ramping time and maximum power level set the slope of the ramp-up portion of power profile 70. This ramp-up portion includes four power step-ups, each separated by time $t_S$ which is equal to the synchronizing period of the system, in this case 1/120 seconds. Thus, time $t_2$ is 3/120 seconds. Since each step in the ramp-up portion is incremental, the steps go from 0 to 20 percent power, 20 to 40 percent power, 40 to 60 percent power, and 60 to 80 percent power.

Once the power reaches its set point level, it is held there for a time $t_3$ chosen by the operator. This time is typically an integral number of multiples of the synchronizing or time base period, which in this example is one-half of the cycle of the 60 Hz power supply. After this time, the power is ramped-down to 0 percent over a time $t_4$ also chosen by the operator. The steps in the ramp down function are separated by the time base period of 1/120 seconds. In this example, time $t_4$ is the same as ramp-up time $t_2$, but this is not a necessary limitation of the device. Area 71 under profile 70 is the total power delivered to the workpiece by the welding transformer.

Figure 5:
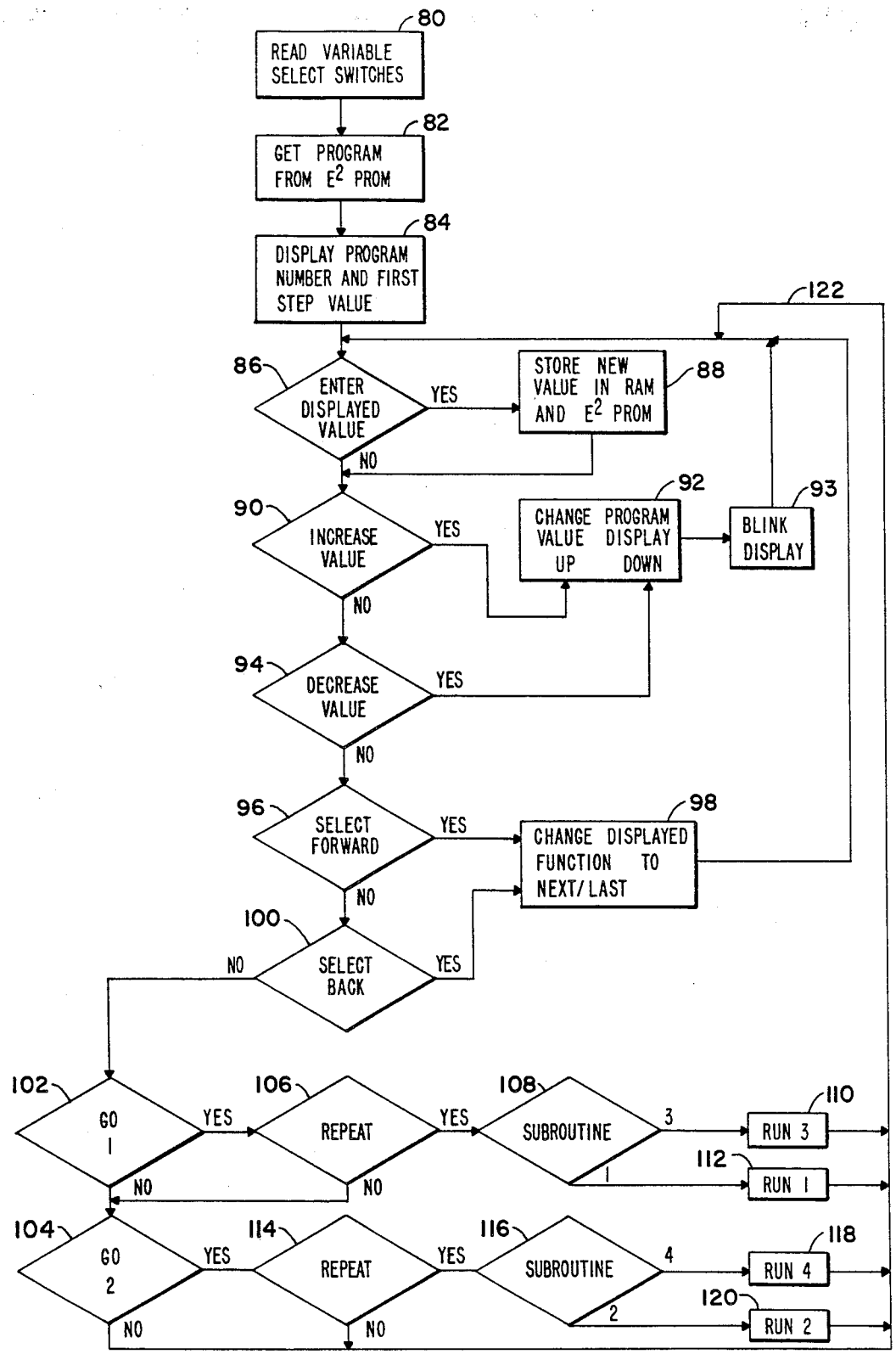
FIG. 5 is a flow chart of the logic of the welding controller of FIG. 2.

The flow chart for the operation of the welding controller is shown in FIG. 5, which should be read in conjunction with Table 1. Table 1 shows the program steps for four subroutines that are typically included in the E$^2$PROM.

RAM and E$^2$PROM. The operator at step 96 then selects the next program step for selection of the proper value of the program variable. The operator may alternatively select the previous program step at step 100. Once the proper program step is chosen, the displayed function is changed accordingly at step 98, and the program returns to step 86.

Once all of the program variables have been selected in the above described manner, the program moves to step 102. At steps 102 and 104, the operator chooses between options G01 or G02. G01 includes subroutines 1 and 3, which involve energizing only one solenoid. G02 includes subroutines 2 and 4, both of which involve energizing a different solenoid. If G01 is chosen, the operator is asked whether the subroutine is to be repeated at step 106. If it is, the operator either chooses subroutine 1 or 3 at step 108, and subroutine 1 or 3 is run at steps 112 or 110 respectively. If G01 is not chosen, G02 may be chosen. If it is, the operator is asked whether this subroutine is to be repeated at step 114. If

TABLE 1

| Subroutine 1 | Subroutine 2 | Subroutine 3 | Subroutine 4 |
|---|---|---|---|
| .Energize Solenoid 1 for time $t_1$ | .Energize Solenoid 2 for Time $t_6$ | .Energize Solenoid 1 for time $t_1$ | .Energize solenoid 1 for time $t_1$ |
| .Ramp-up for time $t_2$ | .Time $t_7$ at Heat 2 | .Ramp-up for time $t_2$ | .Ramp-up for time $t_2$ |
| .Time $t_3$ at Heat 1 | .Hold solenoid 2 for time $t_8$ | .Time $t_3$ at Heat 1 | .Time $t_3$ at Heat 1 |
| .Ramp-down for time $t_4$ | .Release Solenoid 2 | .Ramp-down for time $t_4$ | .Ramp-down for time $t_4$ |
| .Hold Solenoid 1 for time $t_5$ | | .Hold Solenoid 1 for time $t_5$ | .Hold Solenoid 1 for time $t_5$ |
| .Release Solenoid 1 | | .Hold Solenoid 1 for time $t_6$ | .Release Solenoid 1 |
| | | .Time $t_7$ at Heat 2 | .Energize Solenoid 2 for time $t_6$ |
| | | .Hold Solenoid 1 for time $t_8$ | .Time $t_7$ at Heat 2 |
| | | .Release Solenoid 1 | .Hold Solenoid 2 for time $t_8$ |
| | | | .Release Solenoid 2 |

In step 80 of FIG. 5, the microcomputer reads the variable select switches and then in step 82 obtains the program that the operator has selected by means of the variable select switches. The program information, which includes the information for subroutines 1-4 in Table 1, is stored in the E$^2$PROM. The controller then displays the program number and the first step value at step 84. An enter switch is included on the controller to allow the operator to enter the displayed value for each program step. The operator is given this option at step 86, and here can enter whatever value is displayed on LED display 44, FIG. 2. If this value is chosen by the operator, the value is stored in the RAM and E$^2$PROM at step 88. If the displayed value is not chosen, the operator is asked whether he would like to increase or decrease the value at steps 90 and 94. When either is chosen, the operator works a switch that sets the value up or down at step 92. When the desired value is reached, the display is blinked at step 93, and the program returns to step 86.

Step 96 is reached after the correct value for the program variable being chosen has been stored in the so, the operator then chooses either subroutine 2 or 4 at step 116, and the subroutines are run at steps 120 or 118 respectively. After the subroutines are run, or if the operator does not choose either G01 or G02, the program returns to step 86, and the cycle is again repeated.

The variables that are chosen in the programs shown in FIG. 5 are shown in Table 1. In subroutine 1, the operator chooses time $t_1$ that solenoid 1 is to be energized. Solenoid 1 typically controls the welding electrodes that move in to contact the workpiece. The operator also chooses ramp-up time $t_2$ and ramp-down time $t_4$. The power level of the welding transformer, Heat 1, is chosen for a time $t_3$. Then, solenoid 1 may be held for a time $t_5$ before it is released.

Subroutine 2 operates solenoid 2. This is typically used for a post-anneal step. For subroutine 2, the operator chooses the time $t_6$ that the solenoid is energized, time $t_7$ that anneal Heat 2 is maintained, and the time $t_8$ that solenoid 2 remains energized after the anneal cycle is complete. This allows the workpiece to be properly held in place while the materials being welded cool and solidify.

Subroutine 3 is used when weld and post-anneal is desired, and only one solenoid is to be used. After completion of the weld cycle, solenoid 1 is held for time $t_6$, and the anneal heat is applied for time $t_7$ at a power level Heat 2. After the anneal heating, solenoid 1 is held for time $t_8$ to allow the materials to cool, and the solenoid is then released.

Subroutine 4 is chosen when two separate welds, or a weld and post-anneal are desired and where two solenoids are employed. This subroutine is a combination of subroutines 1 and 2. Although four subroutines have been illustrated, up to ten subroutines of various weld and anneal steps can be stored in the $E^2PROM$.

The operator also chooses the polarity of the first pulse from the welding transformer. This is typically accomplished by including a first pulse polarity selector switch 32, FIG. 2, which provides fine tuning of the weld power. The operator may also select the period of the synchronizing signal as either 1 full cycle or a half cycle. If the weld time is controlled in 8.3 millisecond intervals, the SCRs are turned off at each zero crossing of the line voltage. If the period is one cycle, the power is controlled in 1/60 second or 16.7 millisecond increments, thus allowing the SCRs to remain on for longer periods of time.

The welding controller may also be responsive to a thermocouple which measures the temperatures of the materials being annealed or soldered. The DC signal from the thermocouple enters A/D converter 48, FIG. 2. The thermocouple signal is used to vary the anneal heat and/or time to give fine control to the anneal cycle. In response to the temperature signal from the thermocouple, microcomputer 12a, FIG. 2, can automatically decrease the anneal power to maintain a set temperature. In addition, the thermocouple can be utilized to delay the start of the running of anneal time $t_7$ until the materials reach the desired temperature.

More fine tuning of the anneal cycle is provided by including a digital switch that interpolates between programmable set point values for the anneal power level. If, for example, the anneal power level is chosen as 50 percent, and the operator determines that slightly more than this is required to properly anneal the weld, a digital switch adding control to the hundredth of a percentage point is manipulated to increase the power percentage from 50 up to a maximum of 51 percent. This allows the operator to provide for conditions not anticipated when the system is programmed.

The microcomputer can also be programmed to monitor the AC power line voltage and automatically add to or subtract from the power level of the weld or anneal cycle to maintain a constant level regardless of line voltage fluctuation. This line voltage compensation feature provides a welding controller that very exactly regulates the power supplied to the welding transformer.

An analog weld current monitor and control can also be included in the welding controller. The current monitor can detect an overcurrent condition indicative of a shorted SCR, and the microcomputer can be programmed to shut down the system if the weld transformer current goes over a predetermined maximum overcurrent value. The weld current monitor can also detect an open SCR as evidenced by the presence of a signal to the SCR driver but no load current being drawn. Again, the microcomputer is programmed to shut the system down on detection of this condition. The current controller detects current fluctuations due to such things as changes in resistance of the welding electrodes or the workpiece, or line voltage fluctuations, and the microcomputer is programmed to alter the weld current from its set point as needed to maintain a constant power level throughout the weld.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. A microprocessor welding system controller for controlling the welding of a workpiece comprising: p1 switching means for selectively applying power to welding transformer; and
    a single chip microcomputer means for controlling the power delivered to said welding transformer by said switching means to set the power level of said welding transformer, said single chip microcomputer including:
    means for setting the time to reach said power level;
    means for setting the time said power level is maintained;
    means for setting the time to decrease the power level of said welding transformer to zero; and
    means for controlling the polarity of the first half cycle of the power to said welding transformer.

2. The welding system controller of claim 1 in which said means for controlling includes means for actuating said switching means for a selected portion of each half cycle of the power feeding said switching means.

3. The welding system controller of claim 1 in which said switching means includes at least one SCR.

4. The welding system controller of claim 3 in which said means for controlling includes an SCR driver for actuating said SCRs.

5. The welding system controller of claim 1 in which said microcomputer sets the power level to said welding transformer by controlling the time that said SCRs are actuated by said SCR driver.

6. The welding system controller of claim 5 further including means for selecting the portion of each half cycle of the line power during which said SCRs are actuated.

7. The welding system controller of claim 1 in which said means for setting the time to reach said power level includes means for increasing the power level to said welding transformer in incremental steps.

8. The welding system controller of claim 7 in which said means for setting the time to reach said power level further includes means for choosing the number of incremental steps to reach said power level.

9. The welding system controller of claim 8 in which each said incremental step is separated by a predetermined time interval.

10. The welding system controller of claim 9 further including means for setting said time interval.

11. The welding system controller of claim 1 in which said means for setting the time to decrease the power level includes means for decreasing the power level of said welding transformer in decremental steps.

12. The welding system controller of claim 11 in which said means for setting the time to decrease the power level further includes means for choosing the number of drecremental steps to reach the zero power level.

13. The welding system controller of claim 12 in which each said drecremental step is separated by a predetermined time interval.

14. The welding system controller of claim 13 further including means for setting said time interval.

15. The welding system controller of claim 1 further including means for setting the period of a synchronizing signal for said means for controlling.

16. The welding system controller of claim 15 in which the period of said synchronizing signal is derived from the period of the line power feeding said means for controlling.

17. The welding system controller of claim 16 further including means for selecting the period of said synchronizing signal as an integral number of multiples of one-half of the period of said line power.

18. The welding system controller of claim 15 in which each said synchronizing signal turns off said switching means to de-energize said welding transformer.

19. The welding system controller of claim 18 in which said means for controller further includes means for turning on said switching means a preselected time after being turned off by said synchronizing signal.

20. The welding system controller of claim 19 further including means for setting said preselected time.

21. The welding system controller of claim 20 in which said preselected time is an integral number of multiples of a preselected timing interval of said means for controlling.

22. The welding system controller of claim 21 further including means for setting said preselected timing interval.

23. The welding system controller of claim 1 in which said means for controlling includes means for accepting analog control information.

24. The welding system controller of claim 23 further including a thermocouple communicating with said means for accepting for monitoring the temperature of said workpiece.

25. The welding system controller of claim 24 in which said means for controlling further includes means for varying the power delivered to said welding transformer to keep the workpiece at a predetermined temperature.

26. The welding system controller of claim 23 further including means, communicating with said means for accepting, for monitoring the line voltage applied to said switching means.

27. The welding system controller of claim 26 in which said means for controlling further includes compensation means for maintaining the power level to said welding transformer when the line voltage fluctuates.

28. The welding system controller of claim 23 further including means, communicating with said means for accepting, for monitoring the power level of said welding transformer.

29. The welding system controller of claim 28 further including means, responsive to said means for monitoring, for shutting off said switching means when said power level falls outside of a predetermined acceptable power range.

30. The welding system controller of claim 28 in which said means for controlling the power delivered to said welding transformer further includes means, responsive to said means for monitoring the power level, for maintaining said power level relatively constant.

31. The welding system controller of claim 1 further including at least one solenoid means controlled by said means for controlling for engaging the welding electrodes with the workpiece.

32. The welding system controller of claim 31 further including means for setting the time that said solenoid means is energized.

33. A welding controller comprising:
an SCR driver for actuating at least one SCR to selectively apply power to a welding transformer;
a single chip microcomputer for controlling said SCR driver to control the power delivered to said welding transformer by said SCRs and set the power level to said welding transformer;
means for selecting said power level;
means for selecting the period of a synchronizing signal for said microcomputer system as an integral number of multiples of one half of the period of the line power feeding the SCRs;
means for setting the time to reach said power level as an integral number of multiples of the period of said synchronizing signal;
means for setting the time said power level is maintained as an integral number of multiples of the period of said synchronizing signal; and
means for setting the time to decrease the power level of said welding transformer to zero as an integral number of multiples of the period of said synchronizing signal.

* * * * *